(12) United States Patent
Dudar

(10) Patent No.: US 10,220,785 B2
(45) Date of Patent: *Mar. 5, 2019

(54) CONTROLLING SIDE-VIEW MIRRORS IN AUTONOMOUS VEHICLES

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/468,553

(22) Filed: Mar. 24, 2017

(65) Prior Publication Data

US 2018/0272942 A1 Sep. 27, 2018

(51) Int. Cl.
- *B60R 1/074* (2006.01)
- *B60Q 1/34* (2006.01)
- *B60R 1/12* (2006.01)
- *H04L 29/08* (2006.01)

(52) U.S. Cl.
CPC .............. *B60R 1/074* (2013.01); *B60Q 1/346* (2013.01); *B60R 1/1207* (2013.01); *B60Q 2400/00* (2013.01); *H04L 67/12* (2013.01)

(58) Field of Classification Search
CPC ....... B60R 1/074; B60R 1/1207; B60Q 1/346; B60Q 2400/00; H04L 67/12
See application file for complete search history.

(56) References Cited

U.S. PATENT DOCUMENTS

| 7,444,241 | B2 | 10/2008 | Grimm |
| 8,662,685 | B2 | 3/2014 | Sim |
| 9,449,390 | B1 * | 9/2016 | Ghneinn ............... G06T 7/254 |
| 2010/0208074 | A1 | 8/2010 | Hattori |
| 2014/0114500 | A1 | 4/2014 | Noh |
| 2015/0286878 | A1 | 10/2015 | Molin et al. |
| 2018/0072230 | A1 | 3/2018 | Dudar |

FOREIGN PATENT DOCUMENTS

| CN | 102717754 A | 10/2012 |
| JP | 2012214083 A | 11/2012 |

OTHER PUBLICATIONS

Search Report from United Kingdom Intellectual Property Office dated Sep. 12, 2018 regarding Application No. GB1804498.2 (4 pages).
Search Report from United Kingdom Intellectual Property Office dated Sep. 18, 2018 regarding Application No. GB1804499.0 (4 pages).

* cited by examiner

*Primary Examiner* — Yuen H Wong
(74) *Attorney, Agent, or Firm* — Bejin Bieneman PLC; Frank A. Mackenzie

(57) ABSTRACT

A method includes deploying a vehicle mirror to a first position and receiving first image data representing the mirror from a second vehicle. The mirror is deployed to a second position and second image data representing the mirror is received. The first and second image data are analyzed to determine an operational status of the mirror.

16 Claims, 10 Drawing Sheets

CONTROLLING SIDE-VIEW MIRRORS IN AUTONOMOUS VEHICLES

CROSS-REFERENCE TO RELATED APPLICATIONS

This application is related to U.S. patent application Ser. No. 15/468,571, entitled "CONTROLLING SIDE-VIEW MIRRORS IN AUTONOMOUS VEHICLES", filed on the same day as this application, the complete contents of which are hereby incorporated herein by reference in their entirety.

BACKGROUND

Vehicles can be equipped to operate in both autonomous and occupant-piloted mode. Such vehicles include side-view mirrors which are extended for occupant-piloted mode. For autonomous operation, vehicles rely on data from sensors such as cameras, LiDAR and radar, and do not require the use of side-view mirrors. In this case, the side-view mirrors may be retracted in to order to reduce aerodynamic drag. Due to a malfunction, however, the side-view mirrors can remain stuck in the extended position. This may go unnoticed by a non-driving occupant during autonomous operation and/or a vehicle may be unoccupied.

DETAILED DESCRIPTION

Figure 1:
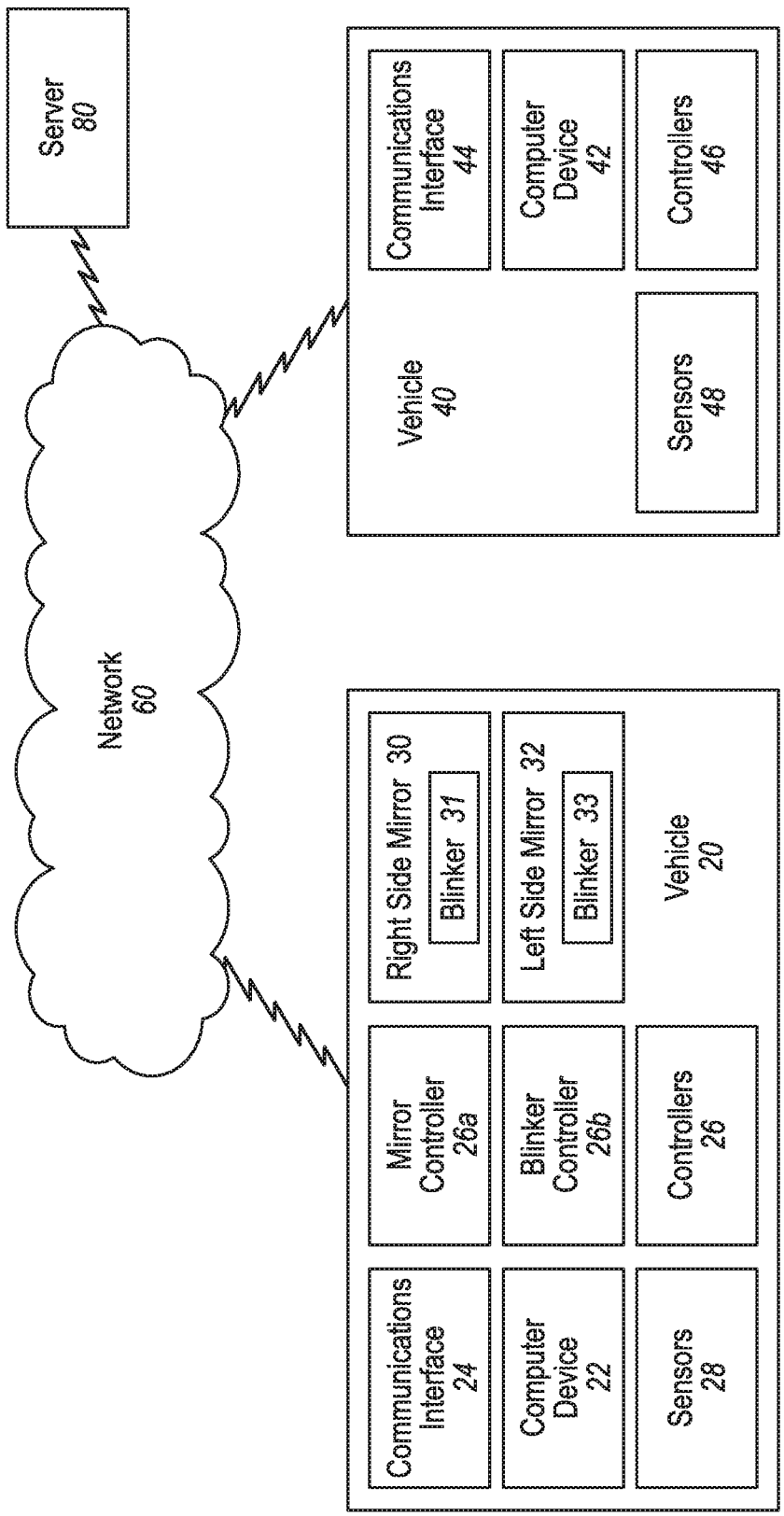
FIG. 1 is a block diagram of an example system for monitoring and controlling vehicle side-view mirrors.

A computing device can determine the operational status of a side-view mirror of a first vehicle based on image data, i.e., images, from sensors in a second vehicle. Side-view mirrors can be defined as mechanical, i.e., including a physical surface that reflects light and that can thereby provide a mirror image, or virtual, for example video-based devices attached externally to the body of a vehicle that provide a digital image on a display screen to assist an occupant in piloting the vehicle by providing views of areas around the vehicle.

Operational status, as used in this disclosure, means a status of a mirror with respect to whether the mirror can be moved between extended and retracted positions. For example, a side-view mirror could be movable between a first, extended position for use by a vehicle occupant, e.g., to see a field of view behind and/or to the side of a vehicle, and a second, retracted position to reduce aerodynamic drag during autonomous vehicle operation. The side-view mirror status is determined to be "operational" when it is determined that it can be deployed to each of the first and second positions. The status of a side-view mirror is "non-operational" when it is determined that the side-view mirror cannot deploy to one or both of the first and second positions. Non-operational states include being stuck in the first position, stuck in the second position, and stuck in between the first and second positions.

In order to determine an operational status, the computing device deploys the side-view mirror on a first vehicle to a first, extended position for occupant piloting. The computing device collects, via, for example, vehicle-to-vehicle communications, first image data from sensors included in a second vehicle, the first image data indicating the position of the side-view mirror after deployment to the first position. The computing device then deploys the side-view mirror of the first vehicle to the second, retracted position and collects second image data from the sensors included in the second vehicle indicating the position of the side-view mirror.

As described in detail below, based on a comparison of the first data to the second data, the computing device determines the operational status of the side-view mirror.

Deploying a side-view mirror is defined herein as changing a position (i.e., moving with respect to one or more axes that can be defined for a three-dimensional coordinate system) of a side-view mirror with respect to the body of a vehicle to which it is attached. Positioning or folding a side-view mirror so as to reduce aerodynamic drag means the mirror is in a "retracted" state. Deploying a side-view mirror into a position for occupant piloting means the mirror is in an "extended" state. A side-view mirrors in any position other than "extended" or "retracted" is defined as being in an "incorrectly deployed" state.

Words used herein indicating directions associated with the first and second vehicle such as, front, rear, back, forward, backward, in front of, behind, leading, following, opposing, facing, left, right, etc. have their regular meaning for a vehicle from the perspective of an occupant of the vehicle seated in the occupant's seat with the occupant's hands on the steering wheel.

A method comprises deploying a vehicle mirror to a first position, receiving, from a second vehicle, a first image representing the mirror; deploying the mirror to a second position; receiving a second image representing the mirror, and analyzing the first and second image to determine an operational status of the mirror. In the method, the operational status can be one of the mirror stuck in the first position, the mirror stuck in the second position; the mirror stuck in between the first and second positions; and the mirror deployable in each of the first and second positions.

The method can further comprise outputting the operational status to at least one of a display and a remote computing device. The method can further comprise determining, via vehicle-to-vehicle communications, prior to deploying the mirror to the first position, that the second vehicle is available to participate in a mirror verification. The method can further comprise activating, prior to receiving the first image, a blinker on the mirror. The method can further comprise determining, prior to deploying the mirror to the first position that a brightness level of ambient light is below a predetermined brightness threshold.

The method can further comprise determining, based at least in part on a determination that a difference between a light intensity of the blinker in the first image and a light intensity of the blinker in the second image is greater than a threshold, that the mirror is deployable in each of the first and second positions. The method can further comprise determining, based at least in part on a determination that a difference between a light intensity of the blinker in the first image and a light intensity of the blinker in the second image is less than a threshold, that the mirror is non-operational, wherein non-operational is one of (1) stuck in the first position, (2) stuck in the second positions and (3) stuck in between the first and second positions.

In the method, the first and second images can be received from a sensor included in the second vehicle, and the method can further comprise determining that the second vehicle is in front of the first vehicle, determining that the light intensity of the blinker is greater than a predetermined threshold in the second image, and based on the light intensity of the blinker in the second image being greater than the predetermined threshold, determining that the mirror is stuck in the first position. In the method, the second vehicle can be facing the first vehicle.

The method can further comprise determining that a sun is behind the first vehicle, and determining the operational status of the mirror based on a difference in reflected light from the sun between the first image and the second image.

Further disclosed is a computer programmed to execute any of the above method steps. Yet further disclosed is a vehicle comprising the computer. Yet further disclosed is a computer program product, comprising a computer readable medium storing instructions executable by a compute processor, to execute any of the above method steps.

A computer is programmed to deploy a vehicle mirror to a first position, receive, from a second vehicle, a first image representing the mirror, deploy the mirror to a second position, receive a second image representing the mirror; and analyze the first and second image to determine an operational status of the mirror. The operational status can be one of the mirror stuck in the first position, the mirror stuck in the second position, the mirror stuck in between the first and second positions, and the mirror deployable in each of the first and second positions.

The computer can be further programmed to output the operational status to at least one of a display and a remote computing device. The computer can be further programmed to activate, prior to receiving the first image, a blinker on the mirror. The computer can be further programmed to determine, prior to deploying the mirror to the first position that a brightness level of ambient light is below a predetermined brightness threshold. The computer can be 15 further programmed to determine, based at least in part on a determination that a difference between a light intensity of the blinker in the first image and a light intensity of the blinker in the second image is greater than a threshold, that the mirror is deployable in each of the first and second positions.

The computer can be further programmed to determine, based at least in part on a determination that a difference between a light intensity of the blinker in the first image data and a light intensity of the blinker in the second image data is less than a threshold, that the mirror is non-operational, wherein non-operational is one of (1) stuck in the first position, (2) stuck in the second positions and (3) stuck in between the first and second positions.

The first and second images can be received from a sensor included in the second vehicle and the computer can be further programmed to determine that the second vehicle is in front of the first vehicle, determine that the light intensity of the blinker is greater than a predetermined threshold in the second image data, and based on the light intensity of the blinker in the second image data being greater than the predetermined threshold, determine that the mirror is stuck in the first position.

The computer can be further programmed to determine that a sun is behind the first vehicle, and determine the operational status of the mirror based on a difference in reflected light from the sun between the first image and the second image.

FIG. 1 is a diagram of a system 10 for verifying the operational status of side-view mirrors on a first vehicle 20 based on image data from a second vehicle 40. The first vehicle 20 and second vehicle 40 are communicatively coupled via a network 60. Additionally, the system 10 may include a server 80 communicatively coupled with the first and second vehicles via the network 60.

As described in detail below, a computing device 22 of the first vehicle 20 instructs controllers 26 to extend (deploy to a first, extended position) and retract (deploy to a second retracted position) right and left side-view mirrors 30, 32. The computing device 22 receives respective data from sensors associated with the second vehicle 40 after each of these instructions are provided. Based on the data, the computing device 22 determines whether the side-view mirrors are operational.

As further described below, in some cases, the computing device 22 may, based on collected data, determine whether the right and left side blinkers 31, 33 associated respectively with right and left side-view mirrors 30, 32 are operational. The right and left blinkers 31, 33 being operational means, in the context of this disclosure, that they turn on and off based on appropriate commands from the computing device 22. As described below, in some cases, a blinker 31, 33 may be controlled to transmit light continuously. In other cases, the blinker 31, 33 may be controller to blink. For the purposes of this disclosure, a blinker is "on" whenever it is transmitting light. That is, in the case that a blinker 31, 33 is controlled to blink, the blinker 31, 33 is considered on for the purposes of this disclosure, during the period of time that it is transmitting light. An example of a blinker 31, 33 that is not operational is a blinker 31, 33 with a burned-out light bulb.

Disclosure herein concerning data being collected and evaluated by the computing device 22 included in the first vehicle 20 does not foreclose such operations in one or more second vehicles 40. The computing device 42 of the second vehicle 40 and the server 80 are each communicatively coupled with the first vehicle 20 computing device 22 and can perform various operations attributed herein to the computing device 22. For example, either of the server 80 and the computing device 42 of the second vehicle 40 can collect data related to the operational status of the side-view mirrors 30, 32 or blinkers 31, 33 and based on the data, make determinations related to the status of the side-view mirrors 30, 32 and/or blinkers 31, 33. As another example, either of the server 80 and the computing device 42 of the second vehicle can collect data and make determinations related to the relative positions of the first and second vehicles 20, 40.

The first vehicle 20 is generally a land-based autonomous vehicle having three or more wheels, e.g., a passenger car, light truck, etc. The first vehicle 20 is operable in autonomous and occupant-piloted mode in accordance with disclosed implementations and includes one or more computing devices 22. The computing device 22 is communicatively coupled to a communications interface 24, a plurality of controllers 26, and one or more sensors 28. As described in additional detail below, the plurality of controllers 26 includes a side-mirror controller 26a for controlling the deployment of the side-mirrors 30, 32 and a blinker controller 26b for turning the blinkers 31, 33 on and off.

The computing device 22 includes a processor and a memory such as are known. Further, the memory includes one or more forms of computer-readable media, and stores instructions executable by the processor for performing various operations, including as disclosed herein. The computing device 22 performs computations for piloting the vehicle 20 during autonomous operation. For example, the computing device 22 may include programming to operate, for example via the controllers 26, one or more of vehicle brakes, propulsion (e.g., control of acceleration in the vehicle 20 by controlling one or more of an internal combustion engine, electric motor, hybrid engine, etc.), steering, climate control, interior and/or exterior lights, etc., as well as to determine whether and when the computing device 22, as opposed to a human operator, is to control such operations.

Note that, although the system/method disclosed herein for determining the operational status of side-view mirrors 30, 32 and blinkers 31, 33 of the first vehicle 20 are well suited for autonomous vehicles, the system/method does not depend on the autonomous, semi-autonomous or manual operation of the first vehicle 20.

The computing device 22 is generally arranged for communications on a vehicle communication network such as a controller area network (CAN) or the like, the vehicle 20 network can include wired or wireless communication mechanism such as are known, e.g., Ethernet or other communication protocols.

Via the vehicle network, the computing device 22 may transmit messages to various devices in the vehicle and/or receive messages from the various devices, e.g., controllers 26, sensors 28, etc. Alternatively, or additionally, in cases where the computing device 22 actually comprises multiple devices, the vehicle communication network may be used for communications between devices represented as the computing device 22 in this disclosure. Further, as mentioned below, various controllers 26 or sensors 28 may provide data to the computing device 22 via the vehicle communication network.

The computing device 22 is programmed for communicating through the communications interface 24 with the second vehicle 40 and in some cases with the server 80, via the network 60. The communications interface 24 can include one or more radio frequency transceivers to utilize various wired and/or wireless networking technologies, e.g., cellular, BLUETOOTH®, dedicated short range communications (DSRC) and wired and/or wireless packet networks.

Controllers 26, as that term is used herein, include computing devices that typically are programmed to control a specific vehicle subsystem. Examples include a powertrain controller, a brake controller, and a steering controller. A controller 26 may be an electronic control unit (ECU) such as is known, possibly including additional programming as described herein. The controllers 26 may be communicatively coupled to and receive instructions from the computing device 22 to actuate the subsystem according to the instructions. For example, the brake controller 26 may receive instructions from the computing device 22 to operate the brakes of the vehicle 20.

The plurality of controllers 26 for the vehicle 20 may include known electronic control units (ECUs) or the like including, as non-limiting examples, one or more powertrain controllers, one or more brake controllers and one or more steering controllers. Each of the controllers may include respective processors and memories and one or more actuators. The controllers may be programmed and connected to a vehicle 20 communications bus, such as a controller area network (CAN) bus or local interconnect network (LIN) bus, to receive instructions from the computing device 22 and control actuators based on the instructions.

In particular, the vehicle 20 includes a mirror controller 26a and a blinker controller 26b. The mirror controller 26a includes a computing device and one or more actuators such as a motor or solenoid, and is programmed to receive instructions from the computing device 22 to control the deployment of the right and left side-view mirrors 30, 32 based on the instructions.

The blinker controller 26b includes a computing device and one or more light switching devices such as a power transistor or relay, and is programmed to receive instructions from the computing device 22 to turn the right and left blinkers 31, 33 on and off. The blinker controller 26b, in order to facilitate a verification of one or both of the right and left mirrors side-view mirrors 30, 32, may turn the right and left blinkers 31, 33 on continuously, i.e., such that they do not blink. Alternatively, the blinker controller 26b may control the blinkers 31, 33 such that they blink at a blinker frequency of, e.g., one Hertz.

Additionally, in some cases, the blinker controller 26b may include diagnostics to determine the operability of the blinker 31, 33. In such cases, the blinker controller 26b may receive instructions from the computing device 22 to diagnose the blinker 31, 33. The blinker controller 26b may diagnose the blinker 31, 33 and provide the result, e.g., the blinker bulb is operational, or the blinker bulb is burned out, to the computing device 22.

Sensors 28 may include a variety of devices known to provide data via the vehicle communications bus. The sensors 28 may be programmed to collect data related to the vehicle 20 and the environment in which the vehicle 20 is operating. By way of example and not limitation, sensors 28 may include e.g., cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 28 may be used to sense the environment in which the vehicle 20 is operating such as weather conditions, the grade of a road, the location of a road, etc.

In particular, the sensors 28 can provide data to determine the location of one or more second vehicles 40 proximate to the first vehicle 20. Proximate to the first vehicle 20 is defined herein to mean within a range that sensors 48 on the second vehicle 40 can collect image data of the side-view mirrors 30, 32 of the first vehicle 20 such that determinations can be made relative to the operability of the side-view mirrors 30, 32 and/or the blinkers 31, 33 associated with the side-view mirrors 30, 32.

The vehicle 40 is also generally a land-based autonomous vehicle, e.g., a motorcycle, a passenger car, light truck, etc. The vehicle 40 includes a computing device 42 similar to the computing device 22 for the vehicle 20. The computing device 42 includes a processor and a memory such as are known. Further, the memory includes one or more forms of computer-readable media, and stores instructions executable by the processor for performing various operations, including as disclosed herein.

The computing device 42 is communicatively coupled with a communications interface 44, a plurality of controllers 46 and one or more sensors 48. The communications interface 44, the plurality of controllers 46 and sensors 48 may be similar to the respective communications interface 24, the plurality of controllers 26 and the sensors 28 included in vehicle 20.

The computing device 42 is programmed to receive requests from other computing devices, such as the computing device 22, and based on the requests, collect image data, i.e., one or more images, via the sensors 48 associated with the second vehicle 40. The computing device 42 may further be programmed to transmit image data to the computing device 22 or server 80. Additionally, the computing device 42 may be programmed to evaluate the image data with regard to the operational status of the side-view mirrors 30, 32 and blinkers 31, 33 associated with the first vehicle 20. Determining the operational status of the blinkers 31, 33 includes determining if the blinkers 31, 33 are on or off. As noted above, in some cases the blinker 31, 33 may be controlled to blink. In such cases, the computing device 42 needs to monitor the blinkers 31, 33 for a predetermined period of time, for example two seconds, to determine if the blinker 31, 33 has periods during which it is on, i.e., transmitting light. The computing device 42 may receive a message, for example from the computing device 22 that the blinker 31, 33 is controlled to blink. In other cases, the computing device 42 may not "know" whether the blinker 31, 33 is controlled to blink or to be on continuously, and may monitor the blinker 31, 33 for the predetermined period of time to make sure that, in the case the blinker 31, 33 is blinking, the computing device 42 captures an "on" period.

The computing device 42 may, for example, capture images every 0.25 seconds for a period of two seconds, and determine whether the blinker 31, 33 has a first light intensity in one or more images, that is greater than a second light intensity in one or more other images, by greater than a difference threshold. In the case that the computing device 42 determines that the blinker 31, 33 is blinking, the computing device 42 captures an image of the blinker 31, 33 with the first (higher) light intensity (indicating that the blinker 31, 33 is transmitting light) to the computing device 22 or server 80 for use in determining the operational status of the mirrors 30, 32.

The one or more sensors 48 include a digital camera or other optical imaging device that can receive images and generate image data representative of the images. Collected image data is typically in a digital format including one or more images that each include pixels at various colors and intensities as is known.

The network 60 represents one or more mechanisms by which the first vehicle 20, the second vehicle 40 and the server 80 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). The communications may be point-to-point communications such as vehicle-to-vehicle (V2V) and vehicle-to-infrastructure (V2I) communications (collectively V2X), or communications via intermediate devices such as communications satellites, communications relay stations, etc. Exemplary communication networks include wireless communication networks, local area networks (LAN) and/or wide area networks (WAN), including the Internet, providing data communication services.

The server 80 may be one or more computer servers, each generally including at least one processor and at least one memory, the memory storing instructions executable by the processor, including instructions for carrying out various steps and processes described herein. The server 80 may include or be communicatively coupled to a data store for storing collected data. The server 80 is sometime described as "remote," meaning that it is external from the vehicles 20, 40 and requires wireless communications to communicate with the computing devices 22, 42.

The server 80 may be programmed to collect data and make determinations related to the position (absolute and relative) of the first and second vehicles 20, 40, the operational status of the side-view mirrors 30, 32 and the blinkers 31, 33.

Figure 2A:
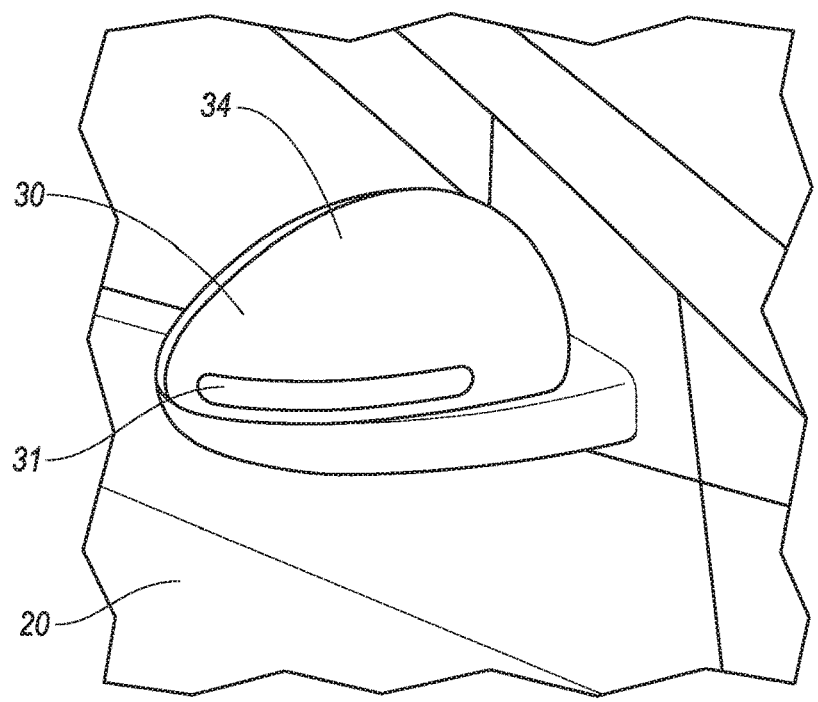
FIG. 2A is a perspective view of an example vehicle right-side mirror including a blinker.
Figure 2B:
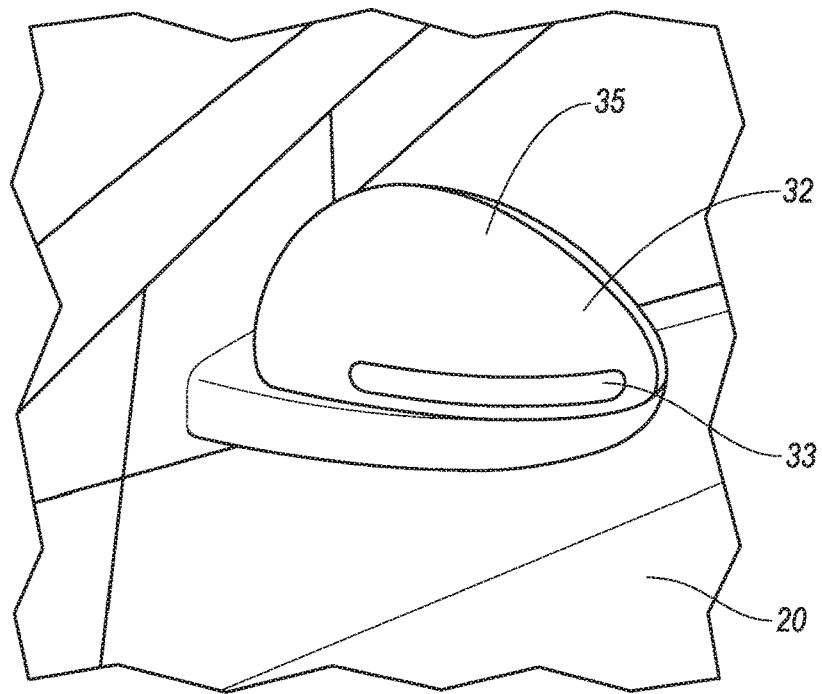
FIG. 2B is a perspective view of an example vehicle left-side mirror including a blinker.

FIGS. 2A and 2B show, respectively, an exemplary right side-view mirror 30 and an exemplary left side-view mirror 32.

The right side-view mirror 30 includes an exemplary blinker 31. FIG. 2A shows the right side-view mirror 30 in a first, extended position relative to the first vehicle 20. The blinker 31 is arranged on a first side 34 of the right side-view mirror 30 such that the blinker 31 faces forward, i.e., in a same direction as a front end 21 (FIG. 3A) of the vehicle 20 with the mirror 30 in the first position.

In a similar manner, the left side-view mirror 32 includes an exemplary blinker 33. As shown in FIG. 2B, blinker 33 is arranged on a first side 35 of the left side-view mirror 32 such that the blinker 33 faces forward, i.e., in the same direction as the front end 21 of the vehicle 20 with the mirror 32 in the first, extended position.

As discussed in detail below, and illustrated in FIGS. 3A, 3B, 4A and 4B, the computing device 22 can, in some cases, verify the operation of the right and left side-view mirrors 30, 32 at night by determining the visibility of the blinkers 31, 33 of the right and left side-view mirrors 30, 32 for each of the first and second mirror positions. The term "at night" is defined for the purposes of this disclosure to be a condition of ambient light dark enough that a blinker 31, 33 that is turned on can be differentiated by the computing device 22 from a blinker that is turned off based on an image captured by a sensor 48. Differentiated in this context means having a difference in light intensity between the on-state and the off-state, greater than a predetermined threshold, wherein the predetermined threshold may depend on an ambient light condition. In a practical system, the condition "at night" may be determined as an ambient light condition below a predetermined brightness threshold. "At night" may also be referred to as "nighttime" herein.

Figure 3A:
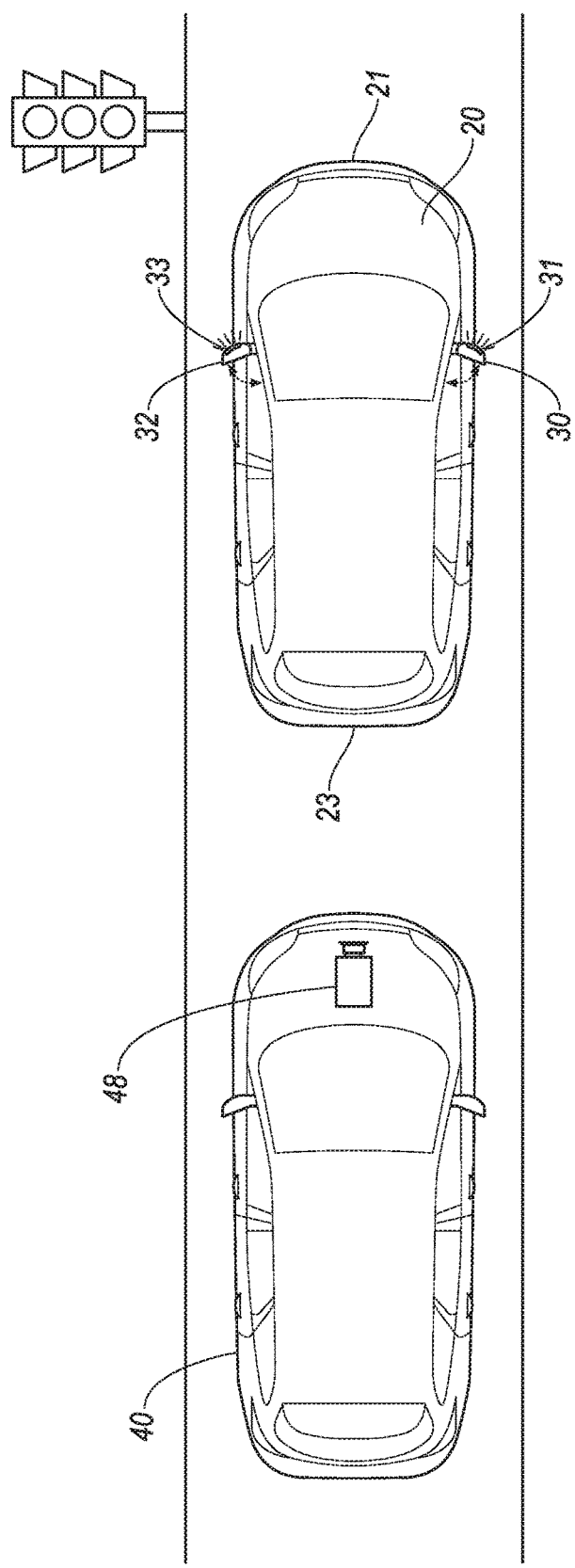
FIG. 3A is a top view of a first vehicle with extended side mirrors followed by a second vehicle.
Figure 3B:
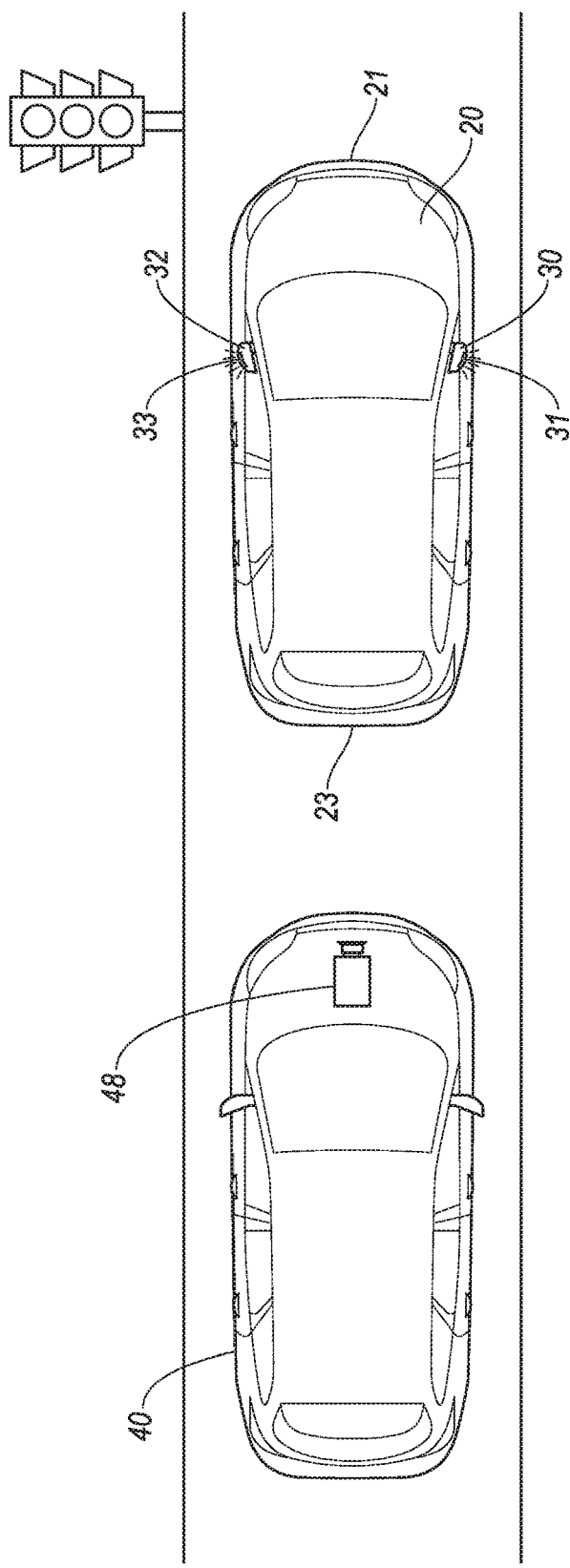
FIG. 3B is a top view of a first vehicle with retracted side mirrors followed by a second vehicle.
Figure 4A:
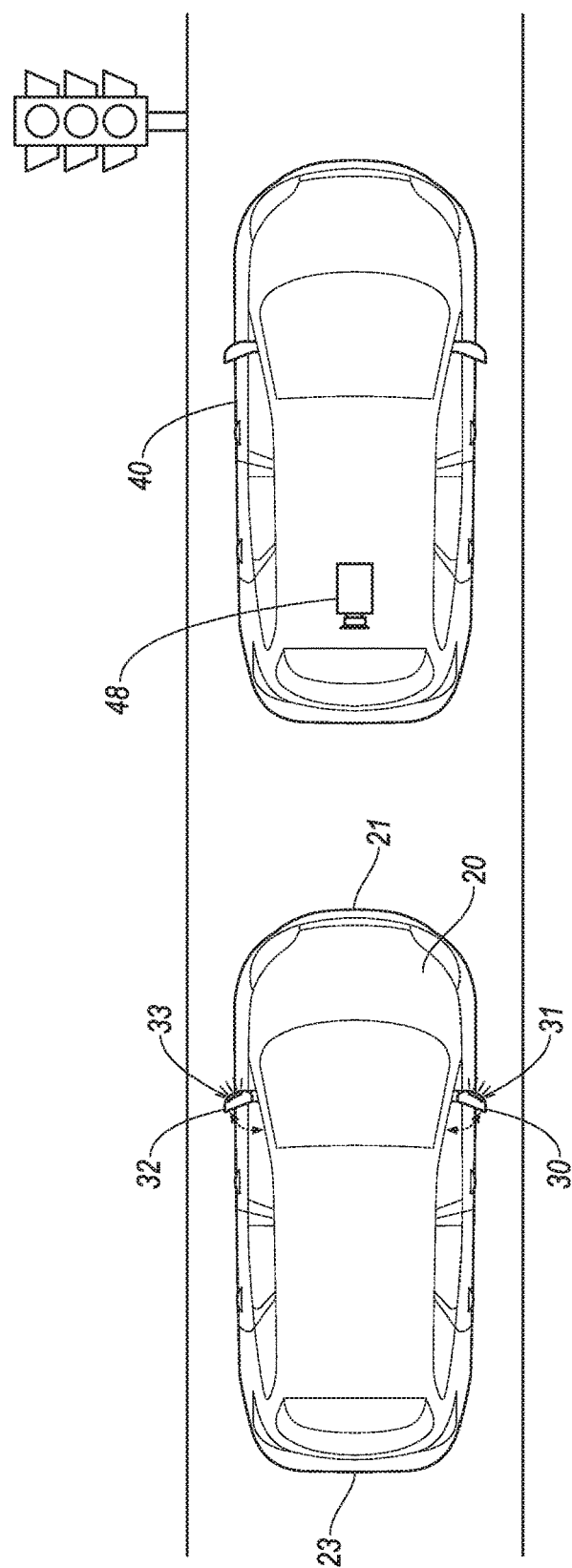
FIG. 4A is a top view of a first vehicle with extended side mirrors behind a second vehicle.
Figure 4B:
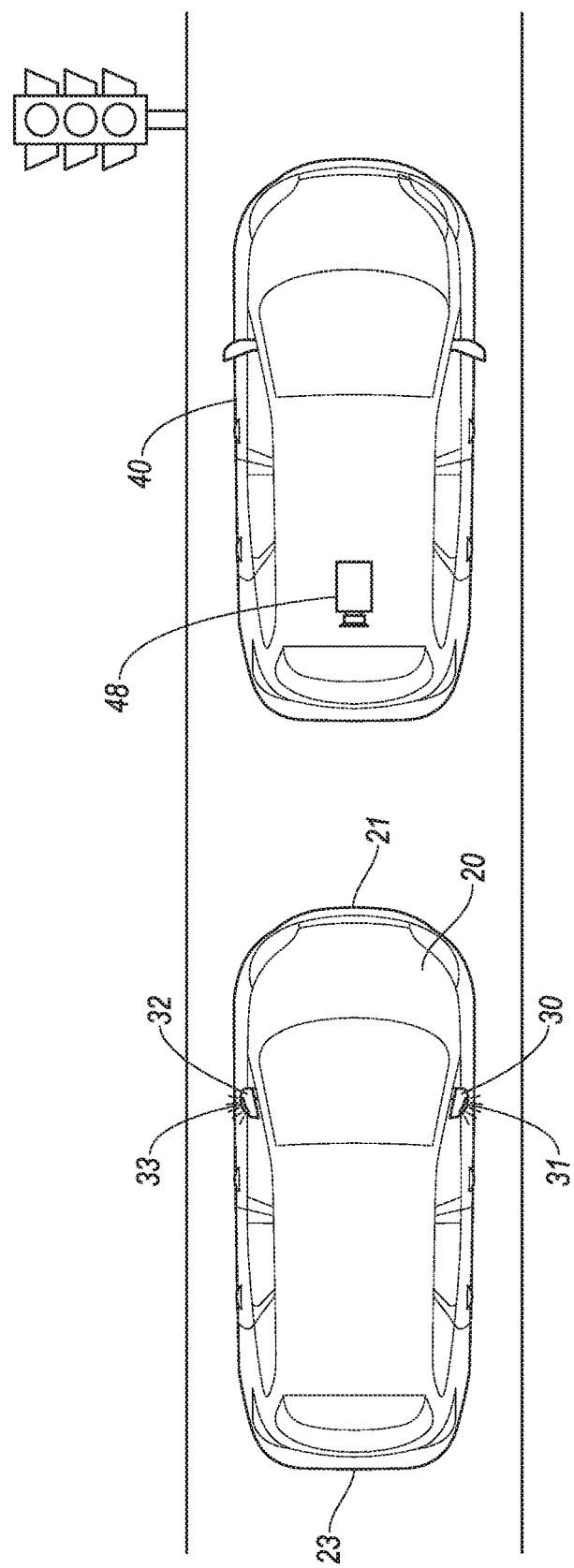
FIG. 4B is a top view of a first vehicle with retracted side mirrors behind a second vehicle.

Determining the visibility of the blinkers 31, 33 can be done, for example, based on image data captured by sensors 48 on the second vehicle 40 from behind the first vehicle 20 as shown in FIGS. 3A and 3B. Alternatively, this can be done based on image data captured by sensors 48 on the second vehicle 40 from in front of the first vehicle 20 as shown in FIGS. 4A and 4B.

FIG. 3A is a top view of a first vehicle 20 in front of a second vehicle 40. The first vehicle 20 includes right and left side-view mirrors 30, 32 deployed in the first position. The second vehicle 40 includes a sensor 48, which may be for example a camera, or other image capturing device.

The blinkers 31, 33 are mounted on or in the right and left side-view mirrors 30, 32 such that they can be detected from the front 21 of the vehicle 20 and not from a rear 23 of the vehicle 20. Accordingly, an image captured by the sensor 48 of the right and left side-view mirrors 30, 32 and the first extended position as shown in FIG. 3A will not include the blinkers 31, 33.

FIG. 3B is a top view of the first vehicle 20 in front of the second vehicle 40 in the same positions as in FIG. 3A. In FIG. 3B, however, the right and left side-view mirrors 30, 32 are deployed in the second, retracted position. In this second, retracted position, at least a portion of each of the blinkers 31, 33 can be detected from a position behind the first vehicle 20. Accordingly, an image captured by the sensor 48 of the right and left side-view mirrors 30, 32 in the second, retracted position will include at least a portion of the blinkers 31, 33.

FIG. 4A is a top view of the first vehicle 20 behind the second vehicle 40. In FIG. 4A, the side-view mirrors 30, 32 are again in the first, extended position. The second vehicle 40 includes a sensor 48 such as a camera or other image capturing device facing towards a rear of the vehicle 40 such that it can capture images of the first vehicle 20 behind the second vehicle 40.

In this configuration, an image of the right and left side-view mirrors 30, 32 captured by the sensor 48 will include the blinkers 31, 33.

FIG. 4B is a top view of the first vehicle 20 behind the second vehicle 40. In FIG. 4B, the side-view mirrors 30, 32 are in the second, retracted position. In this situation, the blinkers 31, 33 are not detectable from in front of the first vehicle 20. Accordingly, an image captured by the sensor 48 of the right and left side-view mirrors 30, 32 will not include the blinkers 31, 33.

Other relative locations and/or movements of the first vehicle 20 and second vehicle 40 may also support determining the operability of the side view mirrors 30, 32. For example, the first and second vehicles 20, 40 may be travelling in opposing directions, or stopped in opposing directions at an intersection. The sensor 48 on the second vehicle 40 may be configured to face the vehicle 20 such that images can be captured of the side-view mirrors 30, 32 in each of the first, extended and second, retracted positions.

Further, as discussed in detail below, and illustrated in FIG. 5, the system 10 can, in some cases, verify the operation of the right and left side-view mirrors 30, 32 in daylight by detecting the sun reflected in the mirrors 30, 32 in the first, extended position, and determining that the reflected sun cannot be detected from the right and left side-view mirrors 30, 32 in the second, retracted position.

Figure 5:
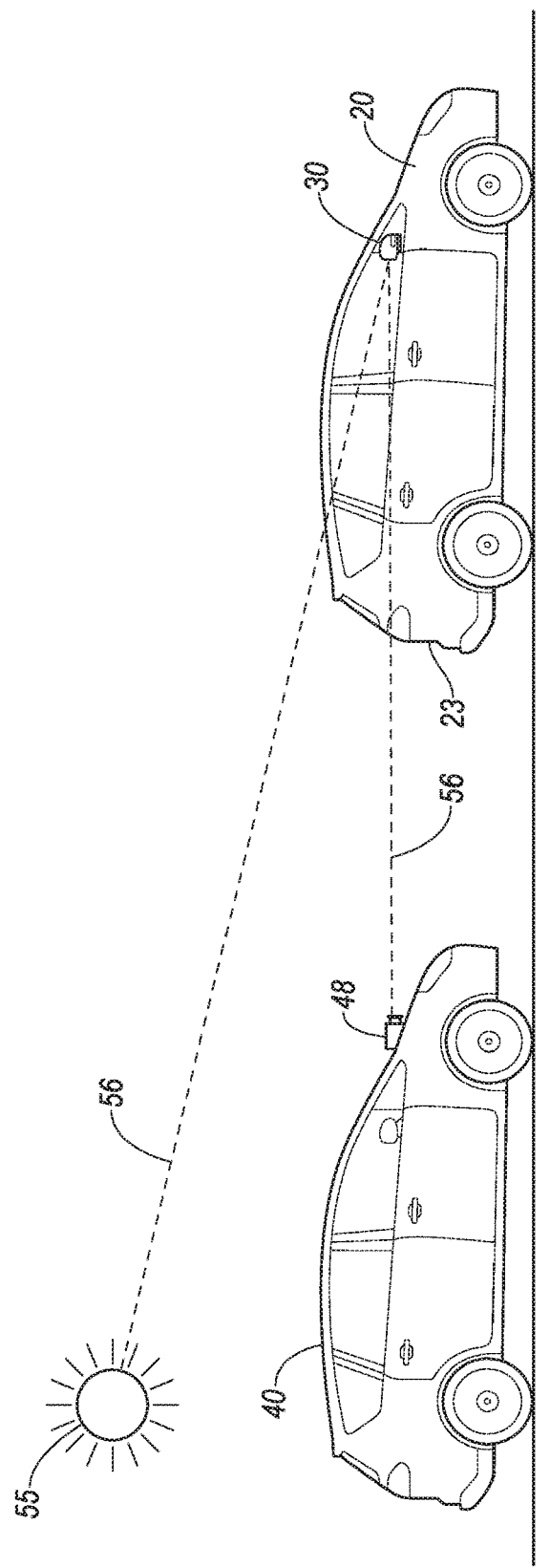
FIG. 5 is a side view of a first vehicle with a side mirror reflecting sunlight such that a sensor on a second vehicle can detect the sunlight.

As shown in FIG. 5, when the first vehicle 20 has its right and left side-view mirrors 30, 32 in the first, extended position, and the sun is in a position behind the first vehicle 20, direct sunlight 56 may be reflected from one or both of the side-view mirrors 30, 32. The direct sunlight 56 may be reflected in a direction, such that the sensor 48 of the second vehicle 40 may capture a first image including the reflected sunlight. When, the first vehicle 20 places the right and left side-view mirrors in the second, retracted position, a second image captured by the sensor 48 of the second vehicle 40 will no longer include the reflected sunlight. Based on a comparison of the first and second images, the computing device 22 may determine the operability of the right and/or left side-view mirrors 30, 32.

Figure 6:
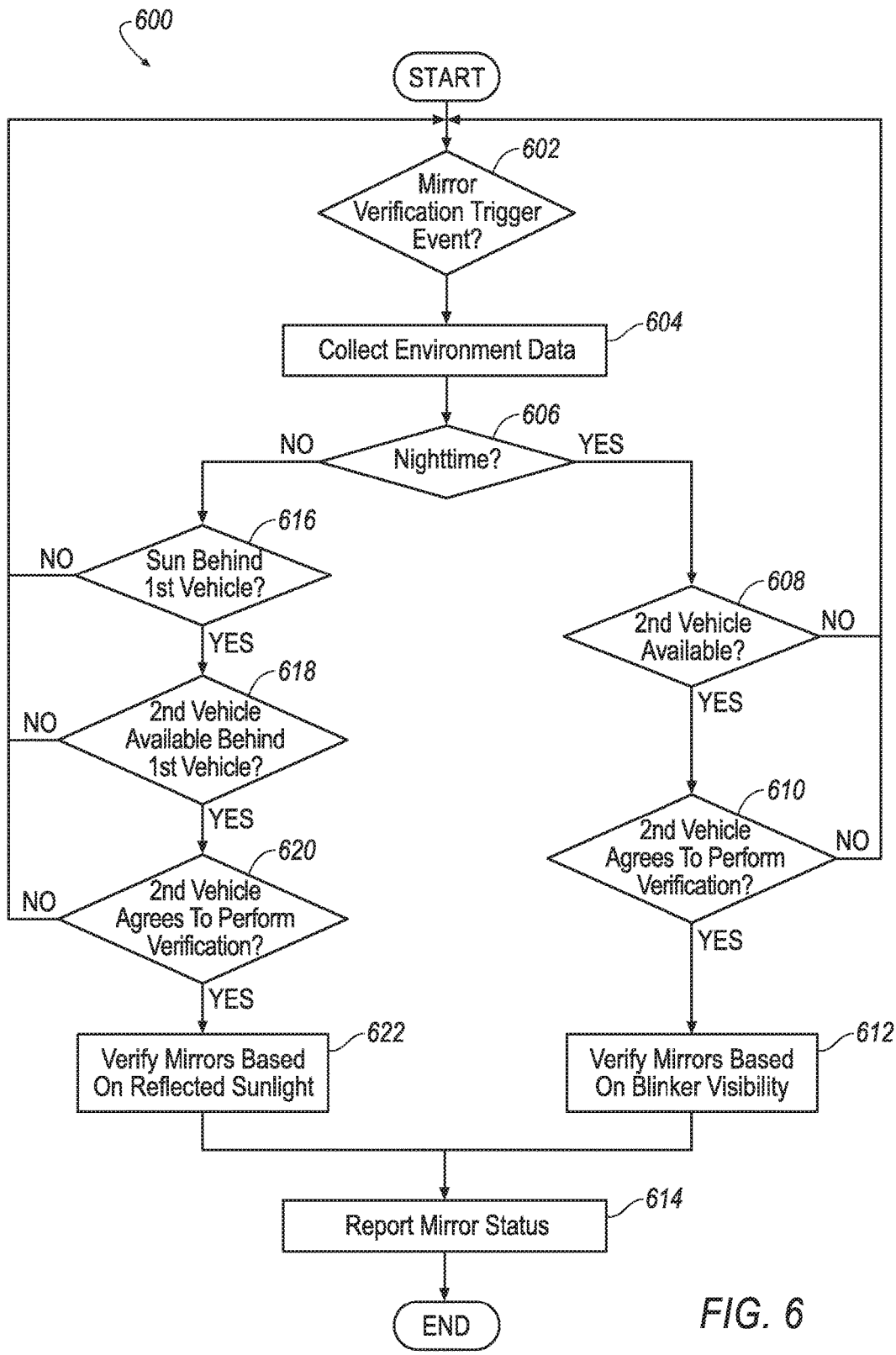
FIG. 6 is a diagram of an exemplary process to determine the operational status of side-view mirrors for a first vehicle.

FIG. 6 is a diagram of an exemplary process 600 to determine the operational status of side-view mirrors 30, 32 for a first vehicle 20. The process 600 starts in a block 602.

In the block 602, the computing device 22 determines whether a mirror verification trigger event has occurred. A mirror verification trigger event is defined for the purposes of this disclosure as a status of the first vehicle 20 that supports determination of the operational status of a side-view mirror 30, 32, such as being stopped at a red light, stuck in a traffic jam, or parked in a parking lot.

For example, the computing device 22 may be programmed to determine the operational status of the side-view mirrors 30, 32 once following each ignition of the first vehicle 20. The computing device 22 may determine that a mirror verification trigger event has occurred when the first vehicle 20 stops at a red light after an ignition of the first vehicle 20. In the event that the mirror verification is not completed the first time that the vehicle 20 stops, the computing device 22 may determine that another mirror verification trigger event has occurred when the first vehicle 20 stops at the next red light.

The trigger event may alternatively or additionally include an indication that a side-view mirror verification is due or past due. As another example, the computing device 22 maybe programmed to conduct a mirror verification once per month. After a month has passed since the last mirror verification, the computing device 22 may continue to attempt a mirror verification each time that the first vehicle 20 has a status that supports verification of the side-view mirrors 30, 32 until the computing device 22 successfully completes the mirror verification process 600.

Upon determining that a mirror verification trigger event has occurred, the process 600 continues in a block 604. In the case that the computing device 22 determines that no mirror verification trigger event has occurred, the process 600 continues in the block 602.

In a block 604, the computing device 22 collects data regarding the environment of the first vehicle 20. The collected data may include the time of day, the current level of ambient light, the availability of a second vehicle 40 in front of or behind the first vehicle 20, the presence and direction of sunlight, and indications of how long the first vehicle 20 will remain in a status that supports mirror verification. Upon collecting the data regarding the environment of the first vehicle 20, the process 600 continues in a block 606.

In the block 606, the process 600 determines whether it is nighttime. Nighttime refers a condition of ambient light dark enough that a blinker that is turned on can be differentiated by the computing device 22 from a blinker that is turned off based on an image captured by a sensor 48. For example, the computing device 22 may determine that it is dark enough to perform a mirror verification when the ambient light is below a predetermined brightness threshold. Additionally or alternatively, the computer device 22 may determine that is dark enough to conduct a nighttime mirror verification based on the time of day, a calendar date, and location of the first vehicle 20. For example, the computing device 22 may, based on tables indicating the time of sunset based on location and calendar date, determine that it is dark enough at 5:30 PM on January 30 in Detroit, Mich. to detect the blinkers 31, 33.

In the case that the computing device 22 determines that it is nighttime, the process 600 continues in a block 608. In the case of that the computing device 22 determines that is not nighttime, process 600 continues in a block 614. "Not nighttime" may also be referred to as "daytime" herein.

In a block 608, the process 600 determines the availability of a second vehicle 40 for performing the side-view mirror verification. The computing device 22 may determine that the second vehicle 40 is available to conduct the side-view mirror verification in the case that the second vehicle 40 is stopped proximate to the first vehicle 20, i.e., in a range in front of the first vehicle 20 or behind the first vehicle 20 in a position where sensors 48 on the second vehicle 40 can capture images of the side-view mirrors 30, 32.

For example, the computing device 22 may determine that the second vehicle 40 is available when the vehicle 40 is stopped directly in front of or directly behind the first vehicle 20 in the same lane of traffic, and less than a predetermined distance from the first vehicle 20. The predetermined distance may be for example a fixed amount such as 50 meters. As another example, the computing device 22 may determine the second vehicle 40 is available in the case that it is stopped in an opposing lane of traffic in a position facing the first vehicle 20 such that sensors 48 on the second vehicle 40 are able to detect the side-view mirrors of the first vehicle 20.

In the case that the computer device 22 determines the second vehicle 40 is available, the process 600 continues in a block 610. In the case that the computing device 22 determines that no second vehicle 40 is available, the process 600 continues in a block 602.

In the block 610, the process 600 determines whether the second vehicle 40 agrees to perform a mirror verification. For example, the computing device 22 may transmit a message to the computing device 42 associated with the second vehicle 40 requesting that computing device 42 participate in the mirror verification.

The computing device 42 may evaluate several criteria to determine whether to participate in the mirror verification. The second vehicle 40 may initially evaluate whether the second vehicle 40 will remain within a range of the first vehicle 20 to detect the mirror for a predetermined period of time. The predetermined period of time may be a period long enough to perform the mirror verification.

For example, in the case that the first vehicle 20 and the second vehicle 40 are travelling next to each other in a platoon, and the vehicle 40 is not intending to leave the platoon for a predetermined period of time, the computing device 42 of the second vehicle 40 may determine that the first and second vehicles 20, 40 will be in a range to support the mirror verification for longer than the predetermined period of time and that performing the mirror verification is possible. The computing device 42 may agree to perform the mirror verification.

In another example, the vehicle 40 may determine that the vehicle 40 is leaving the platoon in less than the predetermined period of time, or that the platoon is travelling on curving roads that do not support the mirror verification, and reject the request to participate in the mirror verification. As another example, the second vehicle 40 computing device 42 may determine that ambient light conditions do not support executing the mirror verification. For example, the ambient light might be too bright due to the sun or light from other vehicles and/or infrastructure (e.g., street lights) to execute the mirror verification.

As another example, the second vehicle 40 may request that the first vehicle 20 participate in a mirror verification of a mirror on the second vehicle 40. In some cases, the computing device 42 may only consent to a mirror verification in the case that the first vehicle 20 computing device 22 agrees to reciprocate.

Additionally, the computing device 42 may evaluate other criteria such as weather conditions, the speed of travel, availability of sensors 48 for performing the mirror verification, location of the mirrors 30, 32 on the first vehicle 20 relative to the location of sensors 48 on the second location, etc. in order to determine whether the second vehicle 40 computing device 42 will participate in the mirror verification.

In the case, that the computing device 42 agrees, the process continues in a block 612. In the case that the computing device 42 does not agree, the process returns to the block 602. For the computing device 42 to "agree" means that the computing device 42 responds to the request with a message indicating that the vehicle 40 will participate in the mirror verification.

In the block 612, the process 600 determines the operational status of the side-view mirrors 30, 32 based on the visibility of the respective blinkers 31, 33 and the position of the second vehicle 40 according to the sub-process 700 as described below. Upon completing the sub-process 700, the process 600 continues in a block 614.

In the block 614 which can follow the block 612 or the block 622, the process 600 reports and stores the operational status of the side-view mirrors 30, 32. In the case that the computing device 22 determines that one or both of the side-view mirrors 30, 32 are operational, the computing device 22 may store this result, together with a time/date stamp in local memory, and may output the data to the server 80 for storage. In the case that the computing device 22 determines that one or both of the side-view mirrors 30, 32 is non-operational (stuck in one of the first or second positions, or in between the first and second positions,) the computing device 22 may also store the result in local memory or output the result to the server 80. Additionally or alternatively, the computing device 22 may output to a user of the first vehicle 20 via, for example, a display device in the first vehicle 20, or a text to the mobile phone of a user of the first vehicle 20, etc., a message indicating the operational status of the side-view mirrors 30, 32. Upon outputting and storing the status of the side-view mirrors 30, 32, the process 600 ends.

In a block 616 which can follow from the block 606, the process 600 determines if the sun is in a position behind the first vehicle 20. Behind the first vehicle 20 may include positions directly behind the first vehicle 20 (i.e., on a rear side 23 of the first vehicle 20 at a position along an axis extending directly through the middle of the first vehicle 20, or within a predetermined range of angles, for example +/−five degrees, from the axis extending through the first vehicle 20.

Upon determining that the sun is behind the first vehicle 20, the process 600 continues in a block 618. In the case that the computer device 22 determines that the sun is not behind the first vehicle 20, the process continues in the block 602.

In a block 618, the process 600 determines the availability of a second vehicle 40 behind the first vehicle 20. For example, the computing device 22 may determine whether there is a second vehicle 40 stopped in the same lane as a first vehicle 20 and behind the first vehicle 20 within a range of 50 meters or another predetermined distance. Upon determining that the second vehicle 40 is available behind the first vehicle 20, the process 600 continues in a block 620.

In the block 620, the process 600 determines whether the second vehicle 40 agrees to perform a mirror verification as described above with reference to the block 610. In the case, that the computing device 42 agrees, the process continues in a block 622. In the case that the computing device 42 does not agree, the process returns to the block 602.

In the block 622, the process 600 verifies operation of the side-view mirrors 30, 32 based on the visibility of reflected sunlight according to the sub process 800 as described below. Upon completing the sub-process 800, the process 600 continues in the block 614. As described above, in the block 614, the computing device stores and/or outputs the status of one or both of the side-view mirrors 30, 32. After completing the block 614, the process 600 ends.

Figure 7:
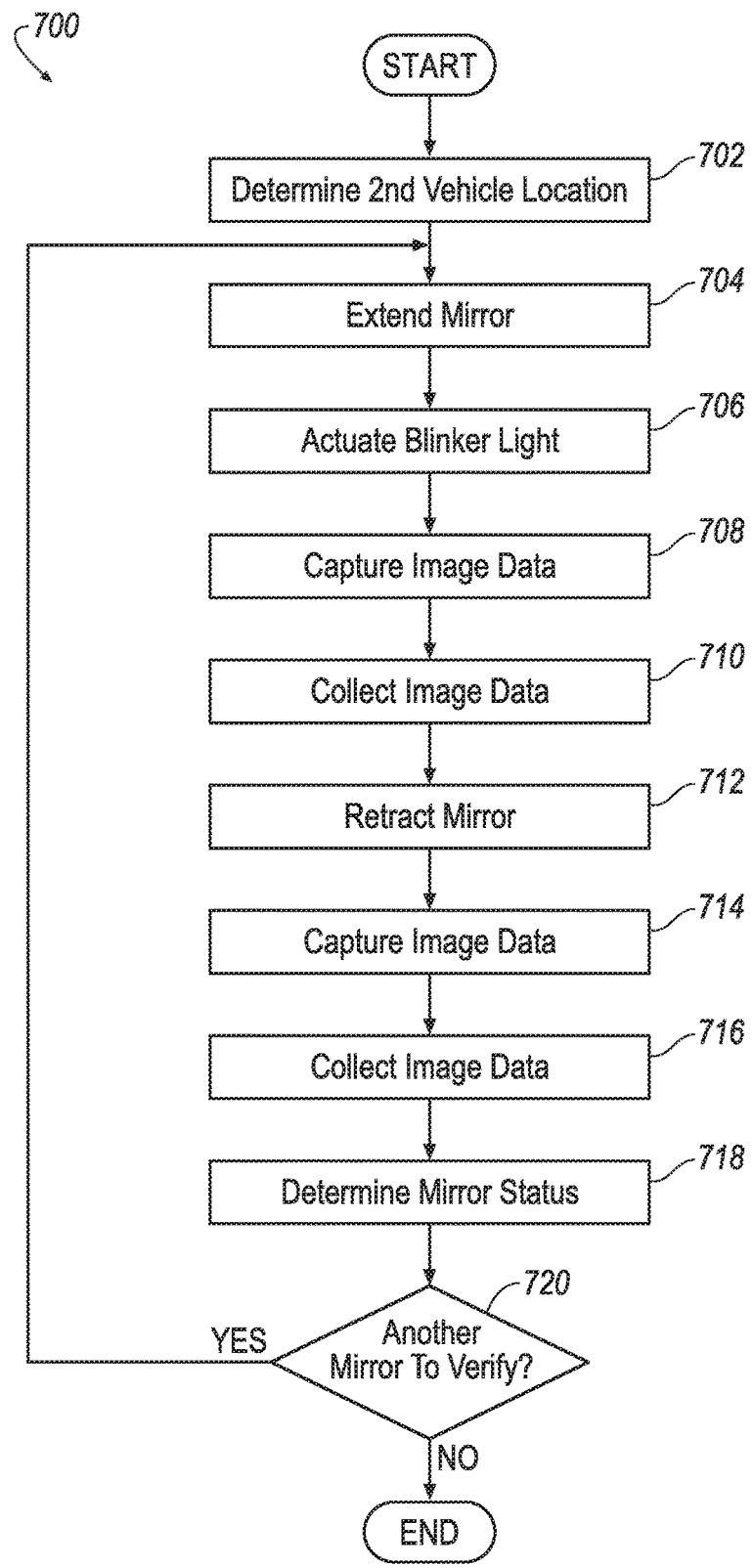
FIG. 7 is a diagram of an exemplary sub-process to determine the operational status of a side-view mirror of a first vehicle during nighttime operation.

FIG. 7 is a diagram of an exemplary sub-process 700 to determine the operational status of one or more side-view mirrors 30, 32 of the first vehicle 20 during nighttime operation. The sub-process 700 is invoked by the block 612 in the process 600 and begins in a block 702.

In the block 702, the sub-process 700 determines a location of the second vehicle 40 relative to the first vehicle 20, i.e., whether the second vehicle 40 is in front of or behind the first vehicle 20. Upon determining, by the computing device 22, whether the second vehicle 40 is in front of or behind the first vehicle 20, the sub-process 700 continues in a block 704.

In a block 704, the computing device 22 of the first vehicle 20 deploys, for example, the right side-view mirror 30 to the first, extended position. Upon deploying the right side-view mirror 30 to the first extended position, the process 700 continues in a block 706.

In the block 706, the computing device 22 activates the blinker 31 associated with the right side-view mirror 30. Additionally, in a vehicle 20 with blinker diagnostic capability, the computing device 22 may determine, for example, via the blinker controller 26b, if the blinker 31 is operational. Upon activating the blinker 31, the process 700 continues in a block 708.

In the block 708, the computing device 42 associated with the second vehicle 40 captures a first image of the right side-view mirror 30. This may be initiated by a request from the computing device 22 to the computing device 42 to capture the first image.

Upon receiving the request, the second vehicle 40 computing device 42 may adjust a direction of a sensor 48 to center the mirror 30, 32 within the first image. For example, in a case that the second vehicle 40 is behind the first vehicle 20, the second vehicle 40 may adjust a horizontal direction of the sensor 48 to a right side of the first vehicle 20, and further adjust an elevation angle of the sensor such that the mirror 30 appears substantially in a middle of the first image. Further, the computing device 42 may adjust a focal length of the sensor 48 such that the mirror 30 occupies a percentage of the first image within a predetermined range, for example in a range of from 20% to 80%. In some cases, a horizontal angle of a sensor relative to the second vehicle 40, i.e., an angle of the sensor 48 relative to an axis running through the first vehicle from back to front, may be fixed. In these cases, the vehicle 40 may adjust an angle of the second vehicle 40 relative to the first vehicle 20.

Upon adjusting the angle, focal length, etc. of the sensor 48, the computing device 42 collects, via the sensor 48 associated with the second vehicle 40, one or more first images of the right side-view mirror 30 on the first vehicle 20. In the case that the second vehicle 40 is behind the first vehicle 20 as shown for example in FIG. 3A, and in the case that the right side mirror 30 is properly deployed to the first position, the first image will not include the blinker 31. On the other hand, in the case that the second vehicle 40 is in front of the first vehicle 20 as shown in FIG. 4A, the first image will include the blinker 31. As described above, initially, the computing device 42 may determine whether the blinker 31 on the mirror 30 is blinking. In the case that the blinker 31 is blinking, the computing device 42 captures the first image during an "on" period of the blinker 31. Upon capturing the first image, the sub-process 700 continues in a block 710.

In a block 710, the computing device 42 associated with the second vehicle 40 may transmit first image data representing the first image to the computing device 22 associated with the first vehicle 20. Additionally or alternatively, the computing device 42 may transmit the first image data to the server 80, or store the data in a memory associated with the computing device 42. Upon transferring and/or storing the first image data, the process 700 continues in a block 712.

In a block 712, the computing device 22 transmits a command to the mirror controller 26a instructing the mirror controller 26a to deploy the right side mirror 30 to the second, retracted position. The process 700 then continues in a block 714.

In the block 714, the computing device 42 associated with the second vehicle 40 captures a second image of the right side-view mirror 30. This may be initiated by a request from the computing device 22 to the computing device 42 to capture the second image.

Upon receiving the request, the second vehicle 40 computing device 42 may center the mirror 30 in the second image by adjusting the angle, focal length, etc. of the sensor 48, as described with respect to the block 708. The computing device 42 then collects, via a sensor 48 associated with the second vehicle 40, one or more second images of the right side-view mirror 30 on the first vehicle 20. In the case that the second vehicle 40 is behind the first vehicle 20 as shown for example in FIG. 3B, and in the case that the right side mirror 30 is properly deployed to the second position, the second image will include the blinker 31. The computing device 42 may determine whether the blinker 31 on the mirror 30 is blinking. In the case that the blinker 31 is blinking, the computing device 42 captures the second image during an "on" period of the blinker 31. On the other hand, in the case that the second vehicle 40 is in front of the first vehicle 20 as shown in FIG. 4B, the first image will not include the blinker 31. Upon capturing the second image, the process 700 continues in a block 716.

In the block 716, the computing device 42 transmits second image data, representing the second image, to the computing device 22 associated with the first vehicle 20. Additionally or alternatively, the computing device 42 may transmit the second image data to the server 80, or store the data in a memory associated with the computing device 42. Upon transferring and/or storing the second image data, the sub-process 700 continues in a block 718.

In the block 718, the computing device 22 determines the status of the right side mirror 30 based on the first and second image data. The status of the right side mirror may be, for example, determined based on a lookup table such as illustrated in Table 1, below.

TABLE 1

| Position of Second Vehicle 40 | Blinker Visible after deployment to position 1 | Blinker visible after deployment to position 2 | Mirror Status |
|---|---|---|---|
| Behind vehicle 1 | no | no | stuck in position 1 |
| Behind vehicle 1 | no | yes | operational |
| Behind vehicle 1 | yes | no | unlikely condition, mirror operating backwards |
| Behind vehicle 1 | yes | yes | stuck in position 2 |
| In front of vehicle 1 | no | no | stuck in position 2 |
| In front of vehicle 1 | no | yes | unlikely condition, mirror operating backwards |

TABLE 1-continued

| Position of Second Vehicle 40 | Blinker Visible after deployment to position 1 | Blinker visible after deployment to position 2 | Mirror Status |
|---|---|---|---|
| In front of vehicle 1 | yes | no | operational |
| In front of vehicle 1 | yes | yes | stuck in position 1 |

"Blinker visible" as used herein is defined as a light intensity greater than a predetermined threshold.

Other algorithms may be used for determining that a side-view mirror is operational. For example, the computing device may determine that the difference in the intensity of blinker light between the first image data and the second image data is greater than a predetermined threshold. A sufficient difference in light intensity between the first and second image data is an indication that the side-view mirror 30 moved from the first position to the second position as expected.

As another example, based on a position of the second vehicle relative to the first vehicle, the computing device 22 may be programmed with an identification of one of the first or second image data as including direct light from a blinker 31, 33. For example, in the case that the second vehicle 40 is behind the first vehicle 20, the computing device 22 may be programmed to determine that light from the blinker 31, 33 is expected in the second image data, but not in the first image data. Then, based on a determination that an intensity of light from the blinker 31, 33 is greater in the second image data than the first image data, the computing device 22 may determine that the associated mirror 30, 32 is operational.

Upon determining the operational status of the right side-view mirror 30, the sub-process 700 continues in a block 720.

In the block 720, the computing device 22 determines that there is another mirror to verify. In the case that the operation of the left side-view mirror 32 has not yet been verified, the sub-process 700 continues in the block 704. Sub-process 700 then repeats blocks 704 through 718 for the best side-view mirror 32 and associated blinker 33. In the case that the operation for both of the right and left side-view mirrors 30, 32 has been verified, the sub-process 700 ends.

The sub-process 700 describes the computing device 22 determining the operational status of the side-view mirror 30. These operations may, however, also be performed by the computing device 42 in the second vehicle 40 or the server 80.

Upon the end of the sub process 700, the exemplary process 600 which invoked the exemplary sub-process 700 continues in the block 614.

Figure 8:
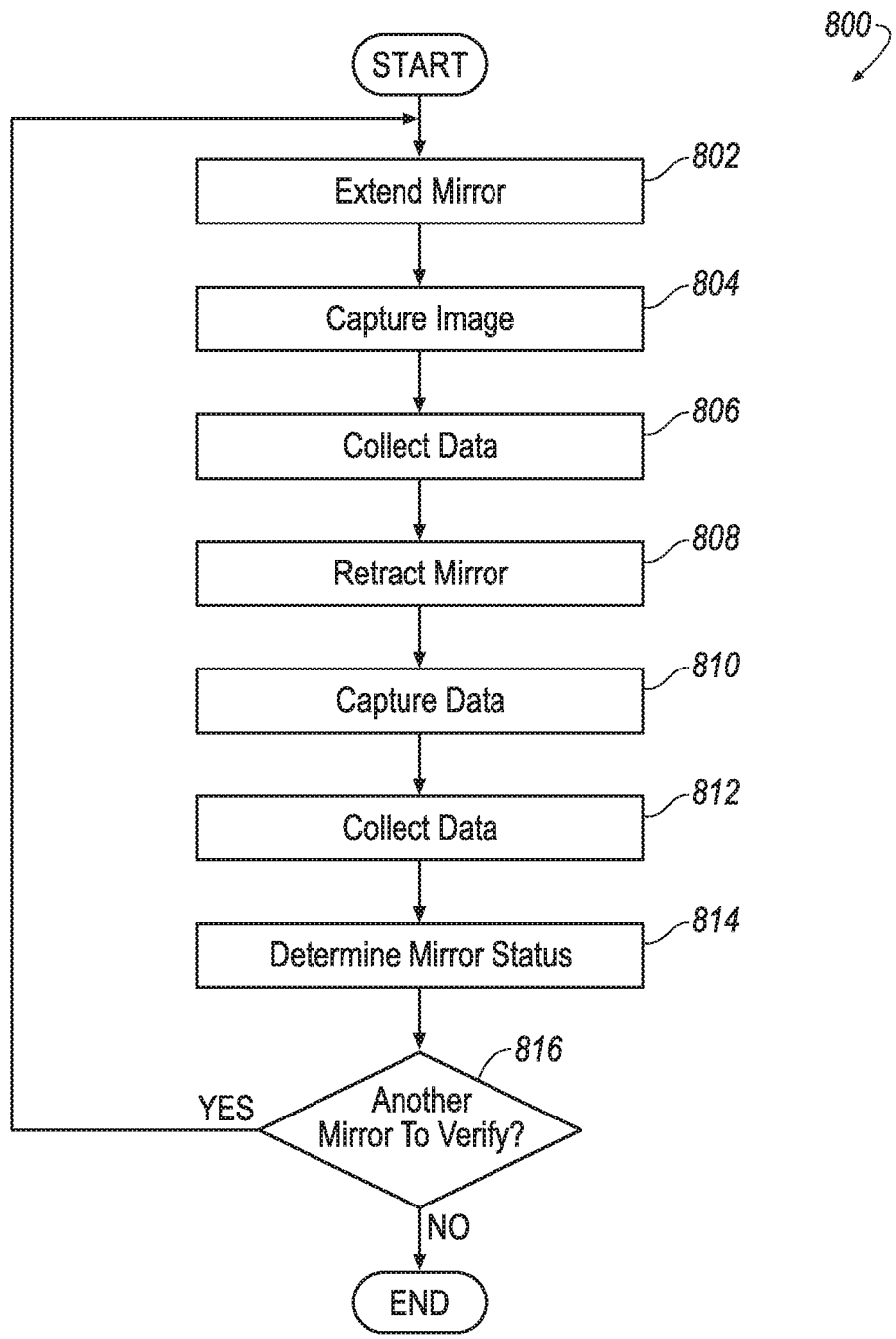
FIG. 8 is a diagram of an exemplary sub-process to determine the operational status of a side-view mirror of a first vehicle during daytime operation.

FIG. 8 is a diagram of an exemplary sub-process 800 to determine the operational status of side-view mirror of the first vehicle 20 during daytime operation. The sub-process 800 is invoked by the block 622 in the process 600 and begins in a block 802.

In the block 802, the computing device 22 of the first vehicle 20 deploys, for example, the right side-view mirror 30 to the first, extended position. Upon deploying the right side-view mirror 30 to the first extended position, the process 800 continues in a block 804.

In the block 804, the computing device 42 associated with the second vehicle 40 captures a first image of the right side-view mirror 30. Initially, the computing device 22 may transmit a message to the computing device 42 via the network 60 requesting that the computing device 42 capture the first image of the right side-view mirror 30.

Upon receiving the request the second vehicle 40 computing device 42 may center the mirror 30 in the first image by adjusting the angle, focal length, etc. of the sensor 48, as described with respect to the block 708. The computing device 42 collects, via a sensor 48 associated with the second vehicle 40, one or more first images of the right side-view mirror 30 on the first vehicle 20. In the case that the second vehicle 40 is behind the first vehicle 20 as shown for example in FIG. 5, and in the case that the right side mirror 30 is properly deployed to the first position, the first image may include a reflection of direct light from the sun. Upon capturing the first image, the sub-process 800 continues in a block 806.

In a block 806, the computing device 42 associated with the second vehicle 40 transmits first image data representing the first image to the computing device 22 associated with the first vehicle 20. Additionally or alternatively, the computing device 42 may transmit the first image data to the server 80, or store the data in a memory associated with the computing device 42. Upon transferring or storing the first image data, the sub-process 800 continues in a block 808.

In a block 808, the computing device 22 transmits one or more commands to the mirror controller 26a instructing the mirror controller 26a to deploy the right side mirror 30 to the second, retracted position. The sub-process 800 then continues in a block 810.

In the block 810, the computing device 42 associated with the second vehicle 40 captures a second image of the right side-view mirror 30. Initially, the computing device 22 may transmit a message to the computing device 42 via the network 60 requesting that the computing device 42 capture the second image of the right side-view mirror 30.

Upon receiving the request, the second vehicle 40 computing device 42 may center the mirror 30 in the second image by adjusting the angle, focal length, etc. of the sensor 48, as described with respect to the block 708. The computing device 42 collects, via a sensor 48 associated with the second vehicle 40, one or more second images of the right side-view mirror 30 on the first vehicle 20. In the case that the right side-view mirror 30 deployed to the second position, the second image will not include reflected sunlight. Upon capturing the second image, the sub-process 800 continues in a block 812.

In the block 812, the computing device 42 transmits second image data, representing the second image, to the computing device 22 associated with the first vehicle 20. Additionally or alternatively, the computing device 42 may transmit the second image data to the server 80, or store the data in a memory associated with the computing device 42. The sub-process 800 then continues in a block 814.

In the block 814, the sub-process 800 determines the status of the right side mirror 30 based on the first and second image data. The status of the right side mirror 30 may be, for example, determined based on Table 2, below.

TABLE 2

| Reflected sunlight visible after deployment to first position | Reflected sunlight visible after deployment to second position | Mirror Status |
|---|---|---|
| no | no | stuck in position 2 |
| no | yes | unlikely condition, mirror operating backwards |
| yes | no | operational |
| yes | yes | stuck in position 1 |

"Visible" as used in the table above, may mean a brightness level above a predetermined threshold. Alternatively "visible" may mean that a contrast in the image between bright spots (where the sunlight is likely being directly reflected) and less bright spots where the sunlight is likely not being directly reflected) is greater than a predetermined threshold.

Upon determining the status of the right side-view mirror 30, the sub-process 800 continues in a block 816.

In the block 816, the computing device 22 determines whether there is another mirror to verify. In the case that the operation of the left side-view mirror 32 has not yet been verified, the sub-process 800 continues in the block 802. Sub-process 800 then repeats blocks 802 through 7814 for the left side-view mirror 32. In the case that the operation for both of the right and left side-view mirrors 30, 32 has been verified, the sub-process 800 ends.

The sub-process 800 describes the computing device 22 determining the operational status of the side-view mirror 30. These operations may, however, also be performed by the computing device 42 in the second vehicle 40 or the server 80.

In the case that the operational status of a side-view mirror 30, 32 has been determined both in daytime based on reflected sunlight, and in nighttime based on blinker 31, 33 visibility, additional information regarding the status of the blinker 31, 33 can be obtained. Table 3 below indicates the status of a mirror 30, 32 and associated blinker 31, 33 based on the results of both daytime and nighttime tests.

TABLE 3

| Mirror operational based on daytime test | Mirror operational based on nighttime test | Conclusion |
| --- | --- | --- |
| yes | yes | mirror and blinker working |
| no | yes | mirror and blinker working |
| no | no | mirror stuck in first position |
| yes | no | blinker not operational |

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:
1. A method comprising:
determining by a computer comprising a processor and a memory in a first vehicle operating in an autonomous mode that a second vehicle is within a range to detect a side-view mirror;
deploying, in the first vehicle operating in an autonomous mode, a side-view mirror to a first position;
receiving, from the second vehicle, a first image representing the side-view mirror;
deploying the side-view mirror to a second position;
receiving from the second vehicle a second image representing the side-view mirror;
analyzing by the computer the first and second image to determine an operational status of the side-view mirror;
verifying by the computer that the operational status of the side-view mirror is one of (1) stuck in the first position, (2) stuck in the second position, (3) stuck in between the first and second positions, and (4) deployable in each of the first and second positions; and outputting by the computer the operational status to at least one of a display and a remote computing device.

2. The method of claim 1, further comprising:
determining, via vehicle-to-vehicle communications, prior to deploying the side-view mirror to the first position, that the second vehicle is available to participate in a mirror verification.

3. The method of claim 1 further comprising:
activating, prior to receiving the first image, a blinker on the side-view mirror.

4. The method of claim 3 further comprising:
determining, prior to deploying the side-view mirror to the first position, that a brightness level of ambient light is below a predetermined brightness threshold.

5. The method of claim 3 further comprising:
determining based at least in part on a determination that a difference between a light intensity of the blinker in the first image and a light intensity of the blinker in the second image is greater than a threshold, that the side-view mirror is deployable in each of the first and second positions.

6. The method of claim 3 further comprising:
determining based at least in part on a determination that a difference between a light intensity of the blinker in the first image and a light intensity of the blinker in the second image is less than a threshold, that the side-view mirror is non-operational, wherein non-operational is one of (1) stuck in the first position, (2) stuck in the second positions and (3) stuck in between the first and second positions.

7. The method of claim 3, wherein the first and second images are received from a sensor included in the second vehicle, the method further comprising:
determining that the second vehicle is in front of the first vehicle;
determining that a light intensity of the blinker is greater than a predetermined threshold in the second image; and
based on the light intensity of the blinker in the second image being greater than the predetermined threshold, determine that the side-view mirror is stuck in the first position.

8. The method of claim 7, wherein the second vehicle is facing the first vehicle in an opposing direction.

9. The method of claim 1, further comprising:
determining that a sun is behind the first vehicle; and
determining the operational status of the side-view mirror based on a difference in reflected light from the sun between the first image and the second image.

10. A computer comprising a processor and a memory storing instructions executable by the processor such that the computer in a first vehicle is programmed to:
determine that a second vehicle is within a range of the first vehicle operating in an autonomous mode to detect a side-view mirror in the first vehicle;
deploy the side-view mirror in the first vehicle to a first position;
receive, from the second vehicle, a first image representing the side-view mirror;
deploy the side-view mirror to a second position;
receive, from the second vehicle, a second image representing the side-view mirror;
analyze the first and second image to determine an operational status of the side-view mirror:
verify that the operational status of the side-view mirror is one of (1) stuck in the first position, (2) stuck in the second position, (3) stuck in between the first and second positions, and (4) deployable in each of the first and second positions; and
output the operational status to at least one of a display and a remote computing device.

11. The computer of claim 10 further programmed to:
activate, prior to receiving the first image, a blinker on the side-view mirror.

12. The computer of claim 11 further programmed to:
determine, prior to deploying the side-view mirror to the first position, that a brightness level of ambient light is below a predetermined brightness threshold.

13. The computer of claim 11 further programmed to:
determine, based at least in part on a determination that a difference between a light intensity of the blinker in the first image and a light intensity of the blinker in the second image is greater than a threshold, that the side-view mirror is deployable in each of the first and second positions.

14. The computer of claim 11 further programmed to:
determine, based at least in part on a determination that a difference between a light intensity of the blinker in the first image data and a light intensity of the blinker in the second image data is less than a threshold, that the side-view mirror is non-operational, wherein non-operational is one of (1) stuck in the first position, (2) stuck in the second positions and (3) stuck in between the first and second positions.

15. The computer of claim 11, wherein the first and second images are received from a sensor included in the second vehicle, further programmed to:
determine that the second vehicle is in front of the first vehicle;
determine that the light intensity of the blinker is greater than a predetermined threshold in the second image data; and
based on a light intensity of the blinker in the second image data being greater than the predetermined threshold, determine that the side-view mirror is stuck in the first position.

16. The computer of claim 10, further programmed to:
determine that a sun is behind the first vehicle; and
determine the operational status of the side-view mirror based on a difference in reflected light from the sun between the first image and the second image.

* * * * *